US008842429B2

(12) United States Patent
Ahn et al.

(10) Patent No.: US 8,842,429 B2
(45) Date of Patent: Sep. 23, 2014

(54) METHOD AND APPARATUS FOR SECURING PORTABLE ELECTRONIC DEVICE TO ACCESSORY DEVICE

(75) Inventors: Yoo Jung Ahn, Chicago, IL (US); Mark D. Janninck, Glen Ellyn, IL (US)

(73) Assignee: Motorola Mobility LLC, Libertyville, IL (US)

( * ) Notice: Subject to any disclaimer, the term of this patent is extended or adjusted under 35 U.S.C. 154(b) by 168 days.

(21) Appl. No.: 13/343,304

(22) Filed: Jan. 4, 2012

(65) Prior Publication Data
US 2012/0170204 A1    Jul. 5, 2012

Related U.S. Application Data

(60) Provisional application No. 61/429,752, filed on Jan. 4, 2011.

(51) Int. Cl.
G06F 1/16 (2006.01)
H04M 1/04 (2006.01)
H04M 1/725 (2006.01)

(52) U.S. Cl.
CPC .............. *G06F 1/1616* (2013.01); *H04M 1/04* (2013.01); *G06F 1/1632* (2013.01); *H04M 1/72527* (2013.01); *G06F 1/1656* (2013.01)
USPC .................................................. 361/679.41

(58) Field of Classification Search
USPC .................................................. 361/679.41
See application file for complete search history.

(56) References Cited

U.S. PATENT DOCUMENTS 5,020,090 A  *  5/1991  Morris ....................... 455/556.1
5,264,992 A     11/1993 Hogdahl et al.
5,323,291 A      6/1994 Boyle et al.
5,436,857 A      7/1995 Nelson et al.
5,463,742 A     10/1995 Kobayashi
5,555,491 A      9/1996 Tao (Continued)

FOREIGN PATENT DOCUMENTS

EP      2197185 A2       6/2010
WO      2003026153 A1    3/2003
WO   WO 03026153 A1  *  3/2003  ............... H04B 1/38
WO      2010110957 A2    9/2010

OTHER PUBLICATIONS

Patent Cooperation Treaty, "PCT Search Report and Written Opinion of the International Searching Authority" for International Application No. PCT/US2012/020177 (CS38277) Apr. 4, 2012, 11 pages.

(Continued)

*Primary Examiner* — Lisa Lea Edmonds

(57) ABSTRACT

A system and method is described that includes a laptop style portable dock design referred to as the terminal system. The terminal system includes a user interface and provides a flip type dock located behind the terminal system display, and more particularly, but not exclusively, provides a flip type dock that when a mobile device is docked in the flip type dock. The terminal system provides power to the smart device, displays the smart device user interface on the terminal system display, and enables the user to use peripherals connected to the terminal system and interact with the smart device through the user interface of the terminal system. The terminal system provides a way to detachably mate a plurality of portable processor based devices to provide the combined functionality of the terminal system and smart device in an integrated structure.

17 Claims, 10 Drawing Sheets

(56) References Cited

U.S. PATENT DOCUMENTS

| | | | |
|---|---|---|---|
| 5,729,478 A * | 3/1998 | Ma et al. | 361/679.41 |
| 6,029,183 A | 2/2000 | Jenkins et al. | |
| 6,231,371 B1 * | 5/2001 | Helot | 439/374 |
| 6,353,535 B1 * | 3/2002 | Yoshida | 361/679.41 |
| 6,489,932 B1 * | 12/2002 | Chitturi et al. | 345/30 |
| 6,538,880 B1 * | 3/2003 | Kamijo et al. | 361/679.4 |
| 6,605,924 B2 * | 8/2003 | Tanaka et al. | 320/113 |
| 6,697,251 B1 * | 2/2004 | Aisenberg | 361/679.09 |
| 6,798,647 B2 * | 9/2004 | Dickie | 361/679.04 |
| 6,961,237 B2 * | 11/2005 | Dickie | 361/679.04 |
| 6,999,792 B2 * | 2/2006 | Warren | 455/557 |
| 7,054,965 B2 * | 5/2006 | Bell et al. | 710/72 |
| 7,120,462 B2 | 10/2006 | Kumar | |
| 7,197,584 B2 * | 3/2007 | Huber et al. | 710/72 |
| 7,266,391 B2 * | 9/2007 | Warren | 455/557 |
| 7,471,511 B2 * | 12/2008 | Montag et al. | 361/679.41 |
| 7,477,919 B2 * | 1/2009 | Warren | 455/557 |
| 7,549,007 B1 | 6/2009 | Smith et al. | |
| D659,134 S | 5/2012 | Ahn et al. | |
| 8,483,755 B2 * | 7/2013 | Kumar | 455/556.1 |
| 2001/0001083 A1 * | 5/2001 | Helot | 439/131 |
| 2003/0153355 A1 * | 8/2003 | Warren | 455/557 |
| 2004/0019724 A1 * | 1/2004 | Singleton et al. | 710/303 |
| 2004/0080899 A1 * | 4/2004 | Hill et al. | 361/680 |
| 2005/0005176 A1 * | 1/2005 | Park | 713/300 |
| 2005/0185364 A1 * | 8/2005 | Bell et al. | 361/679 |
| 2006/0105808 A1 * | 5/2006 | Warren | 455/557 |
| 2006/0236014 A1 * | 10/2006 | Yin et al. | 710/303 |
| 2008/0026794 A1 * | 1/2008 | Warren | 455/557 |
| 2008/0155159 A1 * | 6/2008 | Rivas et al. | 710/305 |
| 2008/0270665 A1 * | 10/2008 | Senatori et al. | 710/303 |
| 2008/0273297 A1 * | 11/2008 | Kumar | 361/680 |
| 2009/0021903 A1 * | 1/2009 | Chen et al. | 361/683 |
| 2009/0231801 A1 | 9/2009 | Cummins | |
| 2010/0250816 A1 | 9/2010 | Collopy et al. | |
| 2010/0250975 A1 * | 9/2010 | Gill et al. | 713/300 |
| 2010/0251243 A1 * | 9/2010 | Gill et al. | 718/100 |
| 2010/0251361 A1 * | 9/2010 | Collopy et al. | 726/19 |

OTHER PUBLICATIONS

Korean Intellectual Property Office, Notice of Preliminary Rejection for Korean Utility Model Application No. 20-2012-0000085 (CS38277) dated Jun. 5, 2013, 4 pages.

* cited by examiner

METHOD AND APPARATUS FOR SECURING PORTABLE ELECTRONIC DEVICE TO ACCESSORY DEVICE

TECHNICAL FIELD

The present description relates generally to a system and method, for providing a docking terminal for a smart device.

BACKGROUND

Mobile device users have few options for realizing a larger display and full size keyboard to interact efficiently with applications available through a user's mobile device. Whenever mobile devices are used with docking stations, users are challenged by having to carry bulky terminals, or experience limited functionality, poor ergonomics, and manipulate extensive cable and connector systems, as well as the unappealing appearance of the arrangement. Users of portable docking stations desire cable and connector management solutions that enhance the user experience for transport, set-up and use.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
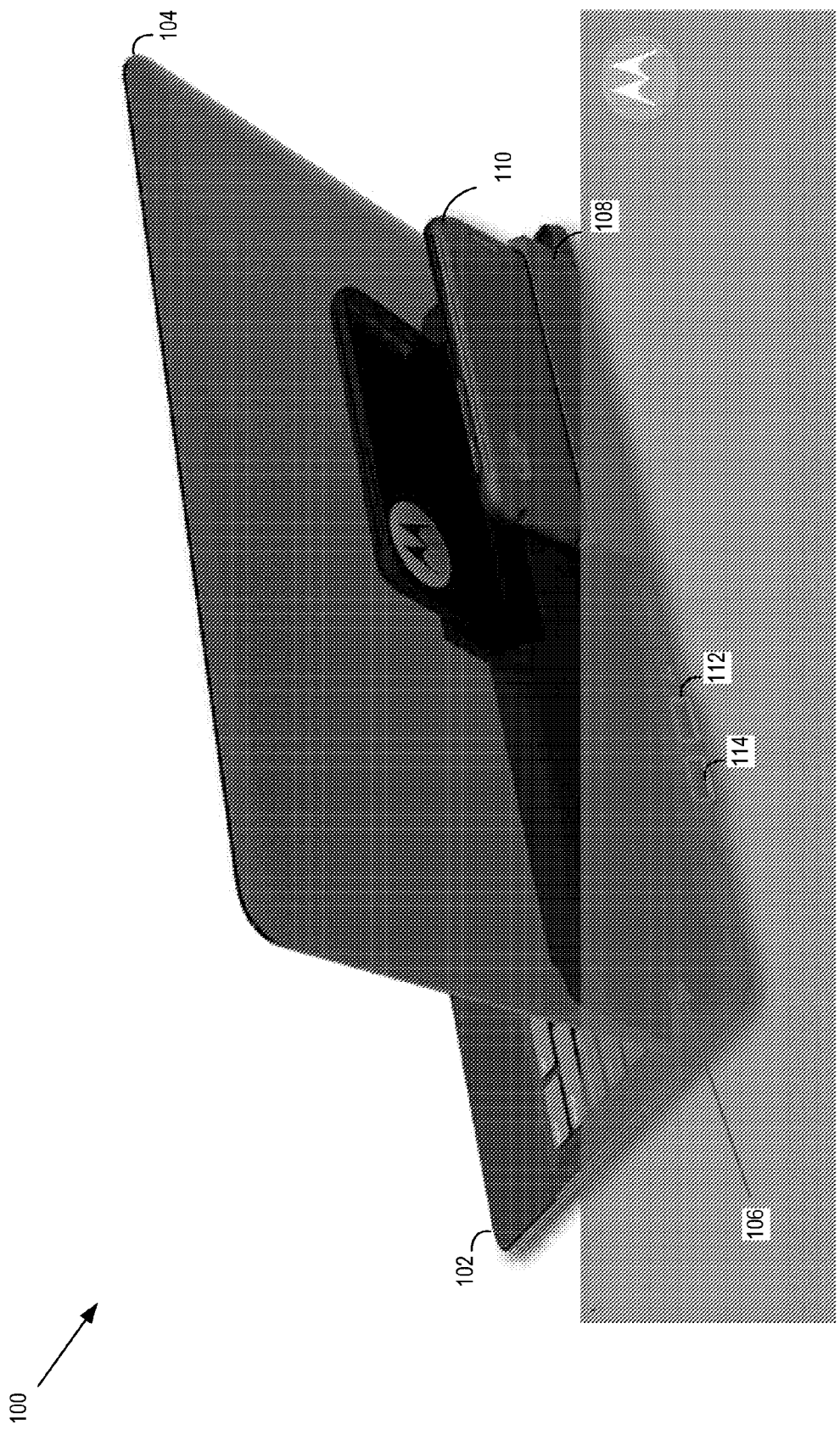
FIG. 1 is a rear perspective view of a terminal system and a smart device in the smart device dock of the terminal system.

In relation to the following description, components shown in different drawings with the same reference numerals basically perform the same function. The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

A laptop style portable docking terminal includes a display and keyboard that facilitates connection and interaction with a mobile smart device. The docking terminal detachably mates with a portable processor based devices (smart devices) to utilize the full processing power of the portable device processor with an enhanced user interface. The terminal enables users to view and modify data from the mobile smart device using the terminal screen, keypad and mouse. To improve transport and performance, a flip-up dock is located behind the display module for receiving the smart terminal, and may include an auto dampening friction hinge. When docked, the docking cradle locates the smart device behind the system display module in an optimum orientation for space efficiency, antenna performance by creating a near field space and antenna orientation, smart device display for viewing when the display module is closed, and enhances the terminal functionally and visual appearance. The docking terminal can be advantageous for docking various smart devices including smart phones, tablet devices, net books, various media devices, and network devices. The terminal allows the user to interact with the full applications and functional capability of the smart device, using the input devices and display of a much larger and more functional user interface.

In a particularly advantageous implementation, the docking terminal can be utilized with a smart device having multiple co-existent independent operating systems, one operating system optimized for the smart device, and the other operating system optimized for a personal computer, such as a desktop or laptop computer. The smart device can initiate a start-up boot sequence, initialize a core kernel, identify whether the device is docked, launch services common to a first operating system and a second operating system, selecting a primary operating system based at least in part upon identifying that the device is docked, launching initializing scripts of a personal computing primary operating system, and launching initializing scripts of a secondary mobile operating system when docked. Additional details regarding how the docking terminal may function with multiple co-existing independent operating environments are discussed in U.S. application Ser. No. 12/839,193 filed on Jul. 19, 2010, (Galicia et al.) entitled "Multi-Environment Operating System," hereby incorporated herein by reference in its entirety. It is envisioned that the mobile operating system can be launched when the smart terminal is determined to be not docked, or if the smart terminal is determined to be docked with the display module closed. In one embodiment, the smart terminal operating system can be displayed on the smart terminal display when the docking terminal display module is closed, and the smart terminal can be displayed in a window of the docking terminal display when the docking terminal display is open.

The terminal system and method may include a portable computer that includes a body, a display module, and hinged connections, wherein the display module includes a display screen, and wherein the hinged connections connect the display module to the body. The hinged connections connect the display module to the body, and are configured to rotate the display module about the hinged connections to a user selectable viewing angle of the display screen relative to the body. The terminal system and method includes a smart device dock that includes a cradle configured to receive a smart device, and a smart device connector configured to connect the smart device to the smart device dock. The smart device connector may include a USB connector, and a HDMI connector. The terminal system and method includes a smart device display component configured to command the smart device to turn off a smart device display, when the terminal system is on and the smart device is in the cradle, and display on the display screen of the terminal system a smart device user interface and/or display interface of the smart device. The smart device display component is further configured to command the smart device to turn on and/or activate the smart device display, when the terminal system is off and the smart device is in the cradle.

The terminal system may be used for applications the user desires to use with a larger display and keyboard than the display and keyboard provided by the smart device. The smart device may provide the processing and the communications functionality to the terminal system, such that the terminal system may use the processor and communications interface of the smart device. The terminal system may alternatively include a processor, and communications interface that operate independent of a smart device being docked in the smart device dock of the terminal system. The terminal system and smart device combined provide suitable conventional computing capabilities for the applications available through by the smart device, including Web word processing, spreadsheet applications, and electronic document reading. The terminal system may alternatively provide, independent of a smart device being docked in the smart device dock, suitable conventional computing capabilities for Web word processing, and spreadsheet applications, and reading electronic documents.

FIG. 1 is a rear perspective view of the terminal system 100. FIG. 1 provides a general overview of a terminal system 100 configured to provide a larger display and keyboard (user interfaces) than the display and keyboard (user interfaces) provided by a hand-held smart device. The terminal system 100 includes a body 102 which is normally on a horizontal or approximately horizontal surface. The terminal system 100 may be configured with various known components (not shown) including, for example, various processors, a memory including a hard drive, and power source such as a battery. The terminal system 100 may be a portable computer configured with the smart device dock. The terminal system 100 includes a display module 104 that includes a display screen and hinged connections 106. The hinged connections 106 connect the display module 104 to the body 102, whereby the display module 104 may be rotated about the hinged connections 106 to allow a suitable viewing angle of the display screen relative to the body 102 to be selected by a user. The hinged connections 106 may use an auto dampening friction hinge. The terminal system 100 also includes a smart device dock 108 configured to cradle a smart device 110 in the smart device dock 108. Accordingly, the dock 108 may be referred to as a cradle. The smart device dock 108 comprises a cradle configured to receive the smart device 110, and a smart device connector configured to connect the smart device 110 to the smart device dock 108. The smart device connector controls various connections including internal USB connectors and HDMI connectors 112, 114. The smart device connector may also include any type of device to device connector now known or subsequently developed, including a Bluetooth connector. The smart device display component is configured to command the smart device to turn off the display of the smart device 110, when the portable computer is on and the smart device 110 is in the cradle. The smart device display component displays the smart device display interface of the smart device 110 on the display screen of the terminal system 100.

Figure 10:
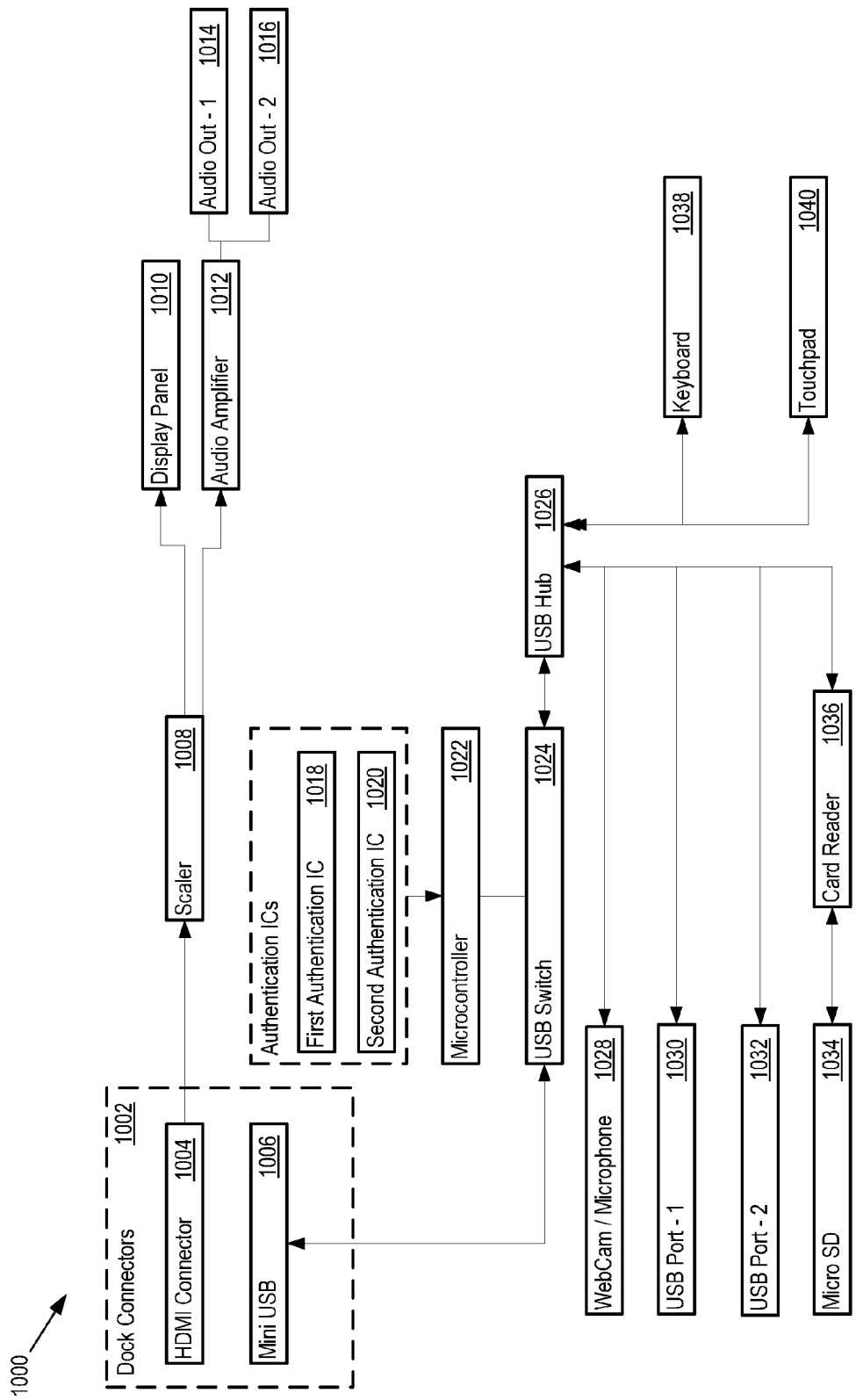
FIG. 10 is an illustration of a circuit diagram that describes components of the terminal system.

Referring briefly to FIG. 10 that is an illustration of a circuit diagram 1000 that describes components of the terminal system. The terminal system includes smart device connectors 1002 such as a HDMI connector 1004 and a micro USB connector 1006. The HDMI connector 1004 is connected to a scaler 1008 connected to the display panel 1010 and audio amplifier 1012 to output audio and video from the HDMI connector 1004. The audio amplifier 1012 is connected to audio output 1014, 1016 such as speakers. The terminal system 100 includes two authentication chips (ICs) 1018, 1020 to manage the device modes of the terminal system 100 as communicated to the smart device 110. When the terminal system 100 is in the open position the first authentication IC 1018 communicates to the smart device 110 that the smart device 110 may use the terminal functions of the terminal system 100. When the terminal system 100 is in the open position the second authentication IC 1020 communicates to the smart device 110 that the smart device 110 may use the terminal system 100 as charging a dock 108. The authentication chips ICs 1018, 1020 are connected to a microcontroller 1022 that controls a USB switch 1024 that is connected to a USB hub 1026. The Mini USB 1006 is also connected to the USB switch 1024, and depending on the device mode detected by the authentication chips ICs 1018, 1020, the various devices connected to the USB hub 1026 are operable, including a webcam and/or microphone 1028, devices connected to the USB ports 1030, 1032, memory in the micro SD port 1034 connected to the card reader 1036 that in turn is connected to the USB hub 1026, and a keyboard 1038 and touch pad 1040.

Figure 2:
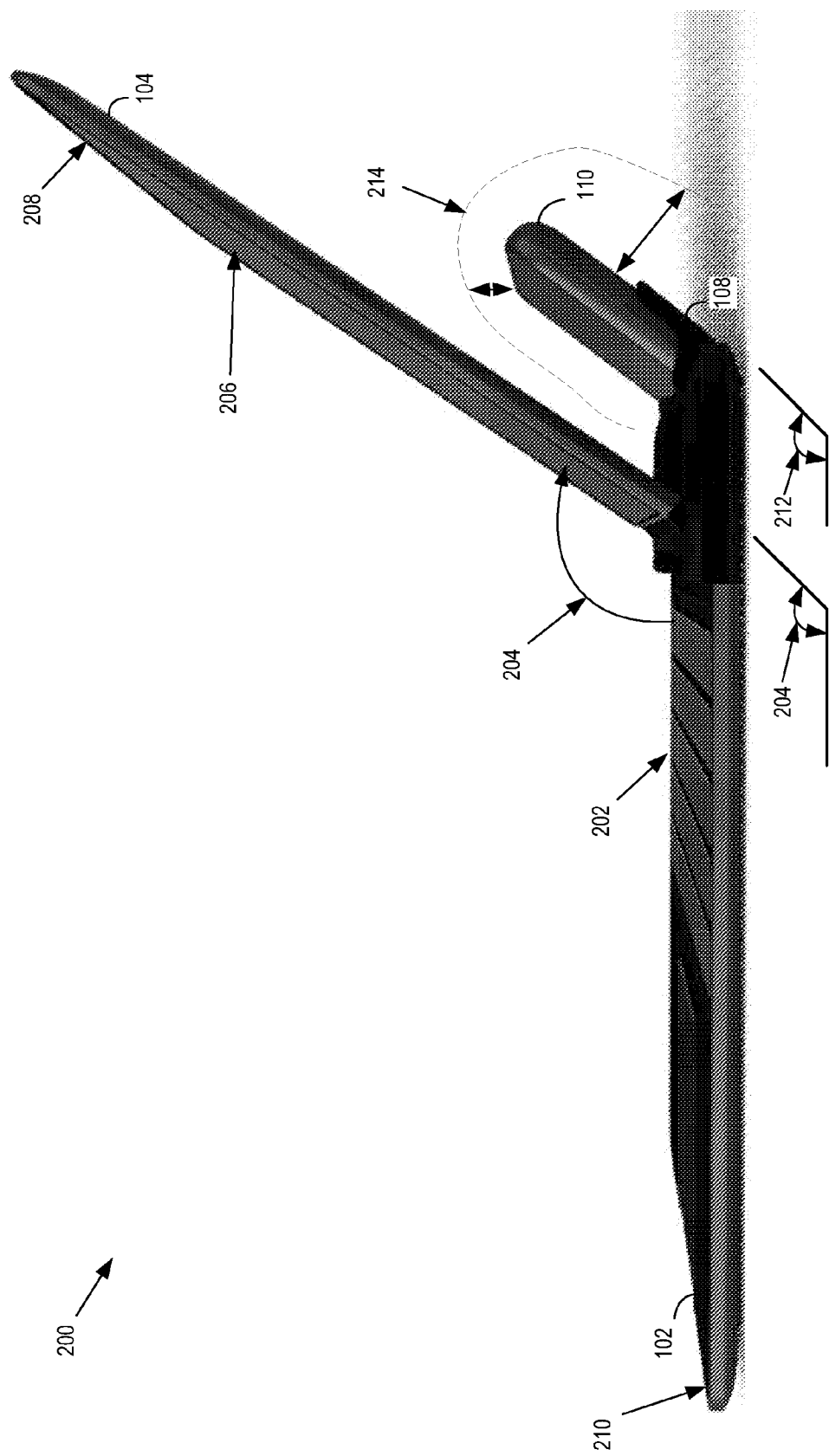
FIG. 2 is a right side view of the terminal system of FIG. 1 with the smart device in the smart device dock cradle.

FIG. 2 is a right side view 200 of the terminal system 100 with the smart device 110 in the smart device dock 108. The terminal system 100 may include a keyboard 202 and touch pad on an upper face of the body 102, as shown in FIG. 2. The terminal system 100 is configured to deliver electrical energy to the smart device 110 from an electrical energy source. The terminal system 100 that may include a power supply (not shown) external to the terminal system 100. The terminal system 100 may be connected to an external power supply via an electrical cable (not shown). The display module 104 may generally be positioned in a range of from 45 degrees to 135 degrees relative to the body 102, although a suitable viewing angle 204 may be found with the angle between the display module 104 and the body 102 between 90 and 120 degrees. The hinged connections 106 are configured to rotate the display module 104 about the hinged connections 106 to a user selectable viewing angle of the display screen 206. The smart device dock 108 is located behind the display screen 206, and connected to the terminal system 100 by the hinged connections 106 configured to rotate the smart device dock 108 about the hinged connections 106 to a user selectable angle relative to the position of the display module 104. The space between the smart device dock 108 and the display screen 206 is such that the viewing angle 204 for the display screen 206 may be adjusted to 120 degrees plus or minus 10 degrees, while the smart device dock angle 212 for the positioning the smart device 110 in the dock 108 may be adjusted to 130 degrees plus or minus 10 degrees. The body 102 of the terminal system 100 may include a keyboard 202, wherein the display screen 206 and the keyboard 202 face one another when the terminal system 100 is in the closed position. The body 102 of the terminal system 100 may alternatively include a touch detection surface with a virtual keyboard, and the display screen 206 may also include a touch detection surface. The terminal display module 104 and display screen 206 are dimensioned substantially larger than the smart device 110. The smart device dock 108 is dimensioned to stably hold the smart device 110 in a position to view the display of the smart device 110 when the terminal system 100 is in the closed position. FIG. 2 further illustrates a near field space 214 created by the antenna orientation of the smart device antenna used to improve antenna performance. The terminal may use a magnet 208 located at the top of the display module 104 and a hall effect switch 210 located on the base 102 of the terminal system 10 to determine whether the terminal system 100 is in the closed position or open position.

Figure 3:
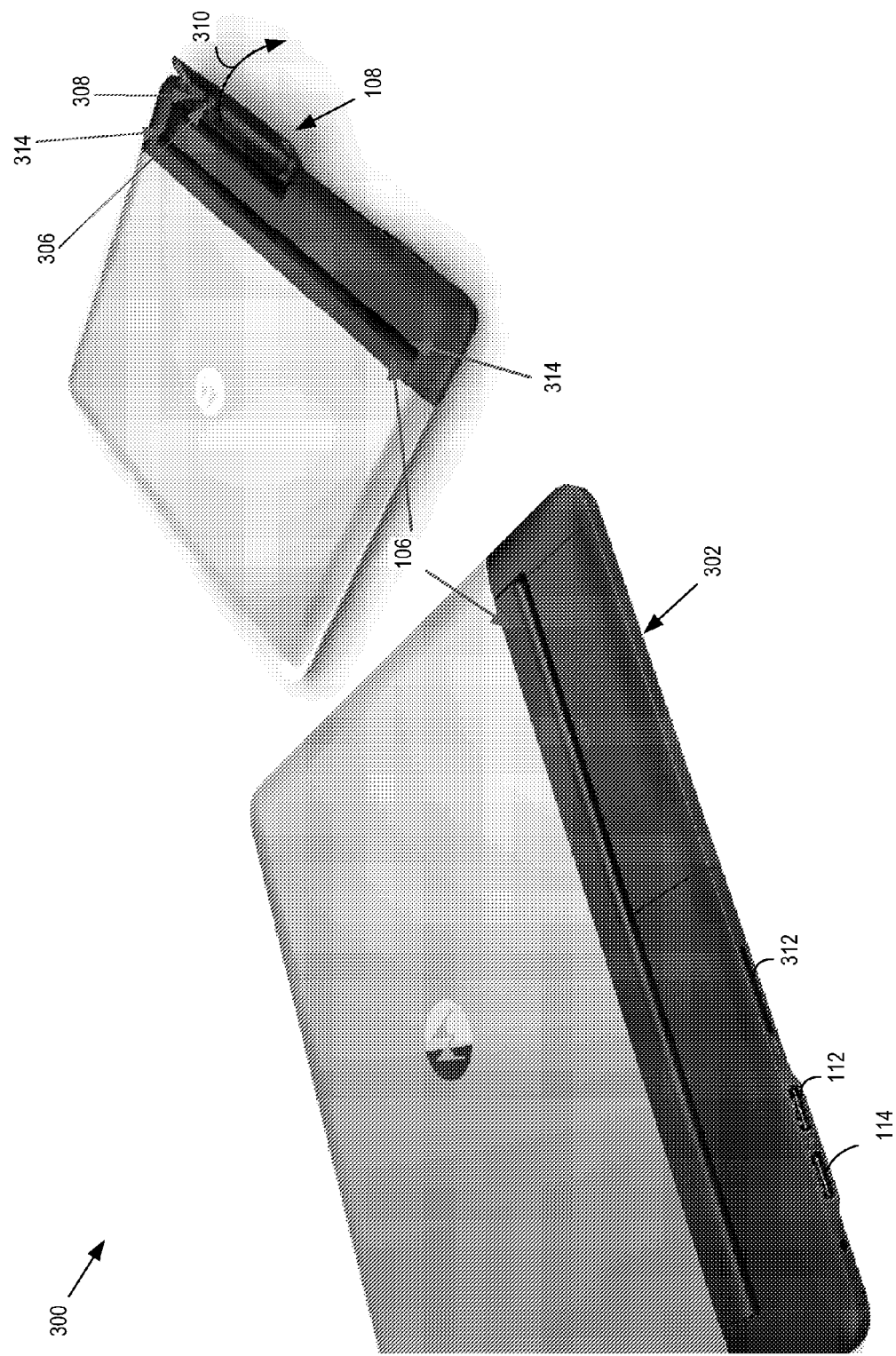
FIG. 3 is a top perspective view of a first terminal system with the dock cradle in the closed position, and a terminal system with the dock cradle in the open position.

FIG. 3 is a top perspective view of two terminal systems in the closed position 300 with the smart device dock 302 of the first terminal system in the closed position, and the second terminal system with the smart device dock 108 in the open position and rotated at an angle 310 about the hinged connections 106. The smart device dock 108 in the open position shows smart device connectors such as micro USB and HDMI connectors 306, 308 to receive the smart device 110 into the smart device dock 108. The terminal system 100 may include various ports 312 to receive peripheral devices such as memory cards. The display 206 and body 102 includes a stop 314 that may be a tab/projection on the back lip of the display module 104 and or hinged connections 106. The stop 314 limits the relative motion of the display module 104 to a limit with the display having a predetermined orientation relative to the orientation of the smart device 110 lodged in the dock. The space between the smart device dock 108 and the display screen 206, and the stop 314 limit the viewing angle 204 for the display screen 206.

Figure 4:
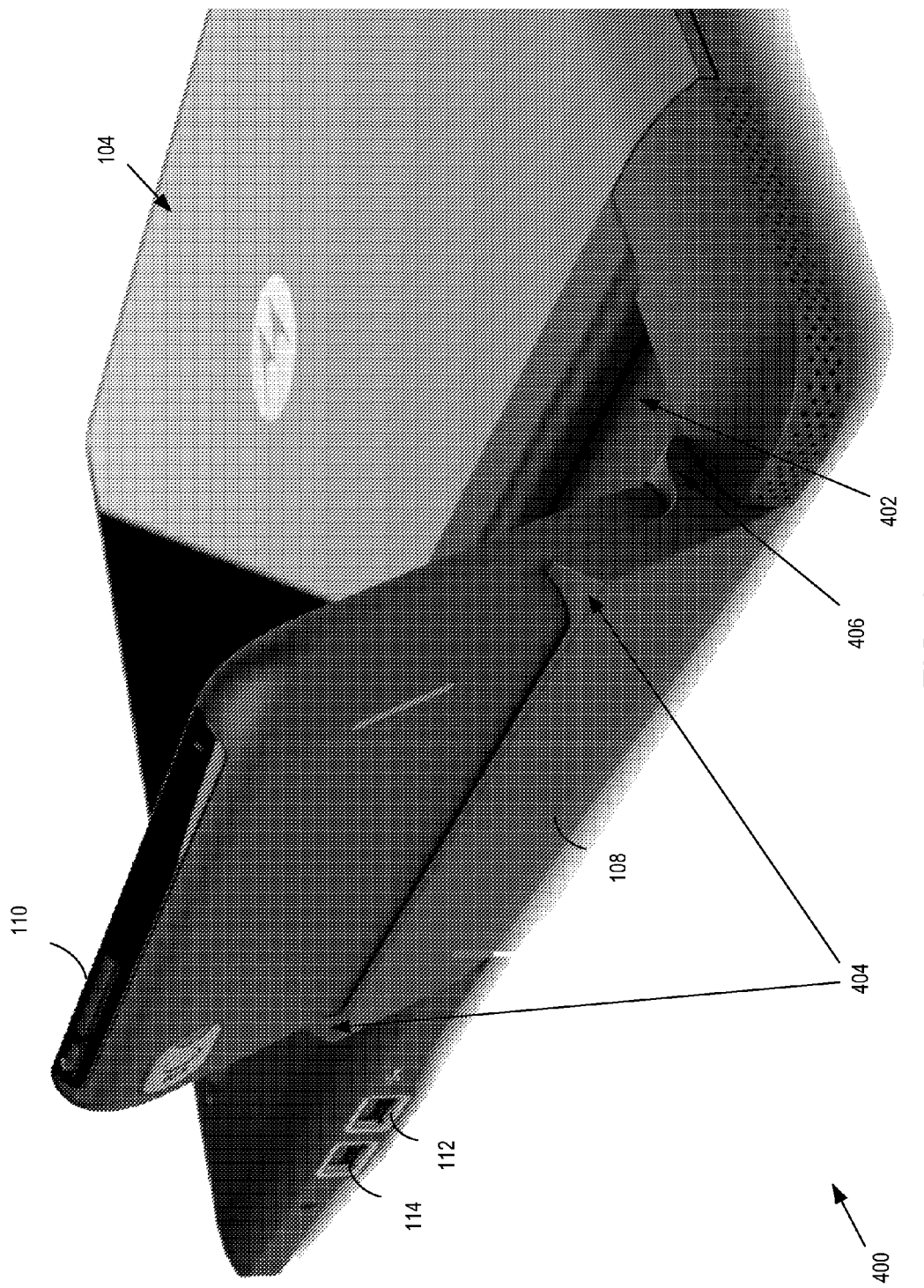
FIG. 4 is a left rear side perspective view of the terminal system in the closed position, and the dock cradle in the open position with a smart device in the cradle.

FIG. 4 is a left rear side perspective view of the terminal system 100 in the closed position with the smart device dock 108 in the open position and with a smart device 110 in the smart device dock 108, and additional USB and HDMI connectors 112, 114 on the rear side view of base. The display module 104 includes a recessed portion 402 in which the smart device dock 108 is located. The smart device dock 108 in the open position shows smart device docking guides 404 on the right and left sides of the back of the smart device dock 108 and the smart device dock base 406. The smart device docking guides 404 may extend perpendicular from the back of the smart device dock 108 in order to guide the smart device 110 into the smart device dock 108 and seat an edge of the smart device 110 on the smart device dock base 406. The smart device dock base 406 provides a surface area to rest an edge of the smart device 110 in order to receive the smart device 110 into the smart device dock 108. The smart device connectors 306, 308 are positioned along the smart device dock base 406 to optimally connect the smart device 110 to the terminal system 100. The position of the smart device connectors 306, 308 along the smart device dock base 406 may be user adjusted along the length of the smart device dock base 406 to optimally connect the smart device 110 to the terminal system 100. The smart device docking guides 404 and the smart device dock base 406 are dimensioned to fit into the recessed portion 402 when the smart device dock 108 is in the closed position. The surface area of the back of the smart device dock 108, the distance that the smart device docking guides 404 extend perpendicular from the back of the smart device dock 108, and the surface area of the smart device dock base 406 are dimensioned to stably hold the smart device 110 in various user adjustable positions to view the display of the smart device when the terminal system 100 is in the closed position. For example, the smart device dock 108 may adjust to a range of angles between 90 to 120 degrees perpendicular to the body 102. The surface area of the back of the smart device dock 108, the smart device docking guides 404, and the smart device dock base 406 are shaped to conform to the body of the smart device and provide mechanical support, relieve strain on the hinged connections 106 and improve the reliability of the electrical connection at the smart device connectors 306, 308. When the terminal system 100 is in the closed position the user may place the smart device in the smart device dock 108 and use the smart device as a clock or widget, or simply charge the smart device 110 through the smart device dock 108. The smart device display component is further configured to command the smart device to turn on and/or activate the display of the smart device, when the terminal system 100 is off and/or in the closed position, and the smart device is in the smart device dock 108.

Figure 5:
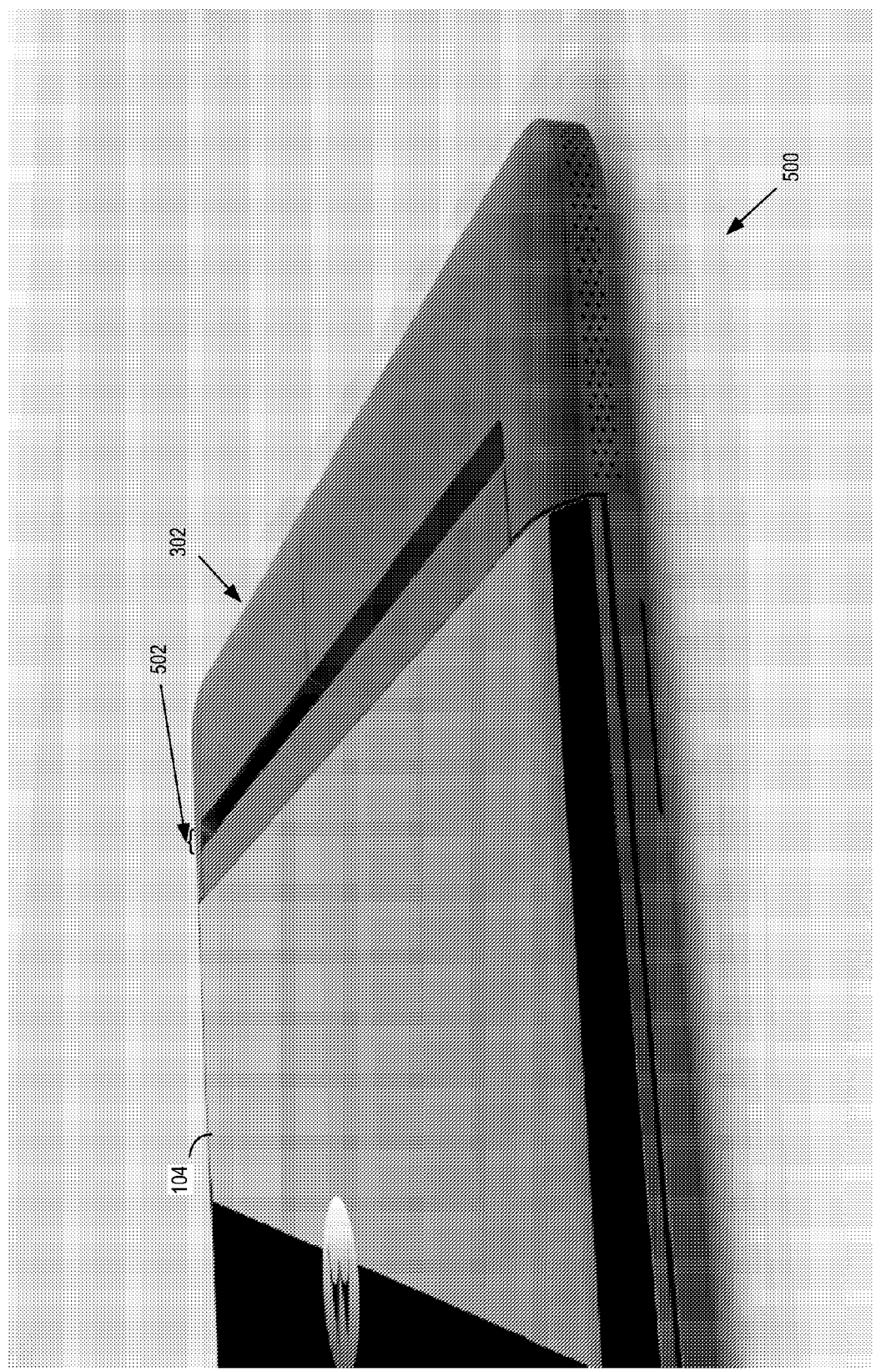
FIG. 5 is a left side perspective view of the terminal system in the closed position with the dock cradle also in the closed position.

FIG. 5 is a left side perspective view 500 of the terminal system 100 in the closed position with the smart device dock 108 in the closed position 302. The smart device dock 108 is an efficient use of space and the region behind the terminal system display, the docking region, is allotted the thickness needed for the dock and makes the entire terminal system compact and thin. The clearance gap 502 behind the closed display affords access to the dock for opening the dock. The smart device dock 108 hides and protects smart device connector that may include a USB connector and a HDMI connector, and provides clean access to the USB and the HDMI connectors for the user to connect the smart device 110 to the smart device dock 108. Using the smart device dock 108 cradle, the smart device (e.g., a phone) is well supported and secured to the terminal system, and improves portability of the terminal as there are no cables tethering the smart device to the terminal.

Figure 6:
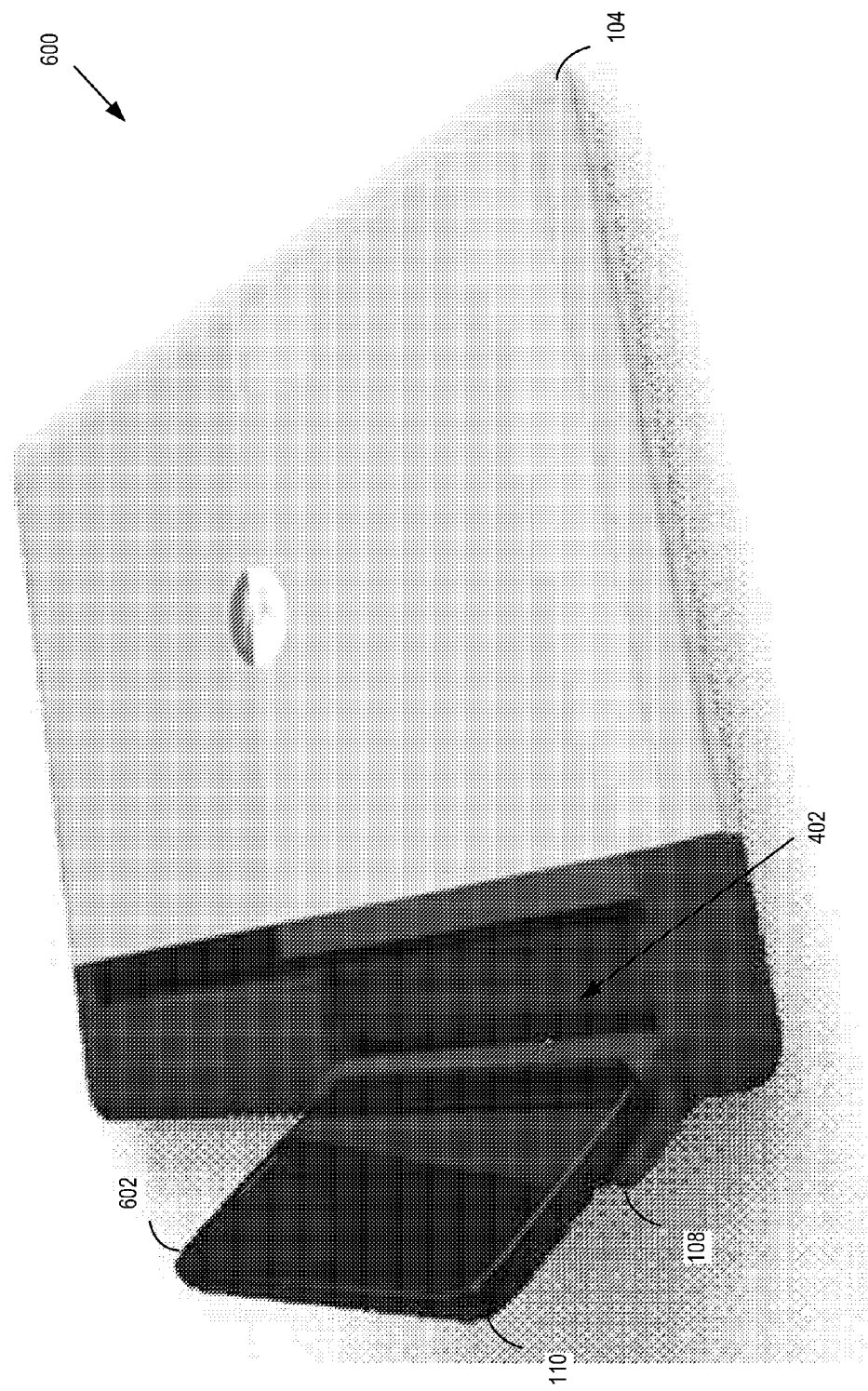
FIG. 6 is a left side perspective view of the terminal system in the closed position with the dock cradle in the open position with the smart device in the cradle.

FIG. 6 is a left side perspective view of the terminal system 100 in the closed position with the smart device dock 108 in the open position with the smart device 110 in the smart device dock 108. The smart device dock 108 is easy to open without adding complicated features, for example when users want to charge their phone (smart device 110) or use peripheral devices connected to the terminal system without opening the terminal display module 104, the phone (smart device 110) display and the smart device user interface 602 is active. The smart device display component is configured to command the smart device to turn on and/or activate the display and smart device user interface 602 of the smart device, when the terminal system 100 is off, and/or in the closed position, and the smart device is in the cradle. The hinged connections 106 include a recessed portion 402 in which the smart device dock 108 is located. When the terminal system 100 is in the closed position and the smart device 110 placed in the dock 108, the smart device 110 may operate as a clock or widget, and the user may access peripherals connected to the terminal and interact with the smart device 110 through the smart device user interface 602. The smart device user interface 602 may be configured to include touch detection technology to receive user input.

Figure 7:
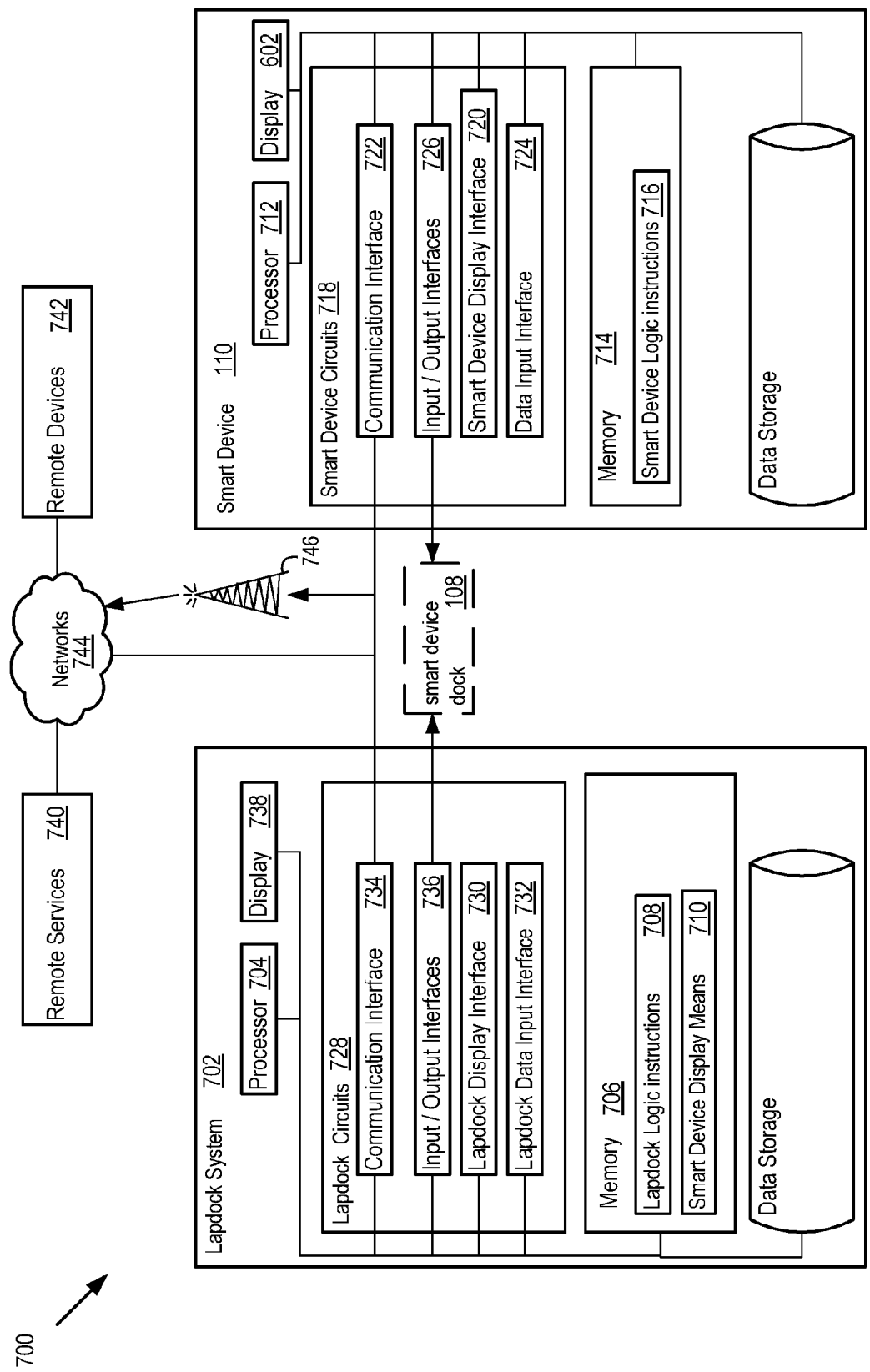
FIG. 7 is an illustration of a computer system configuration that may be used for the terminal system.

FIG. 7 is an illustration of a terminal system configuration 700 that includes a terminal system 702. The terminal system 702 includes a processor 704, and a memory 706 coupled to the processor 704. The memory 706 includes terminal logic instructions 708 executable by the processor 704 that when executed cause the processor 704 to control the smart device dock 108. The memory 706 also includes the smart device display component 710 that displays the content of the smart device display interface on the display screen 206 of the display module 104. The terminal system configuration 700 includes the smart device 110 that includes a processor 712 and a memory 714 coupled to the processor 712. The memory 714 includes smart device logic instructions 716 executable by the processor 712 that when executed cause the processor 712 to control the smart device 110. The smart device 110 may include a plurality of smart device circuits 718, wherein the processor 712 controls the operation of the smart device circuits 718. The smart device circuits 718 may include a smart device display interface 720, a communication interface 722, and a data input interface 724, and/or other user interfaces, including input/output interfaces 726. The smart device display component 710 causes the terminal system 702 processor 704 to display the content of the smart device display interface on the display screen 206 of the display module 104. The terminal system 702 may include a plurality of terminal circuits 728 that include a display interface 730, a data input interface 732, a communication interface 734, and/or other user interfaces, including input/output interfaces 736. When the smart device 110 is docked in the smart device dock 108, the smart device 110 may control the operation of at least one of the terminal circuits 728 and the terminal system display 738. The terminal system configuration 700 enables the user to use the terminal system 702 to access remote services 740 and remote devices 742 via a network 744, when the smart device 110 is in the smart device dock 108. The communication interface 722 may communicate with the network 744 using a smart device antenna 746 connected to the communication interface 722.

Figure 8:
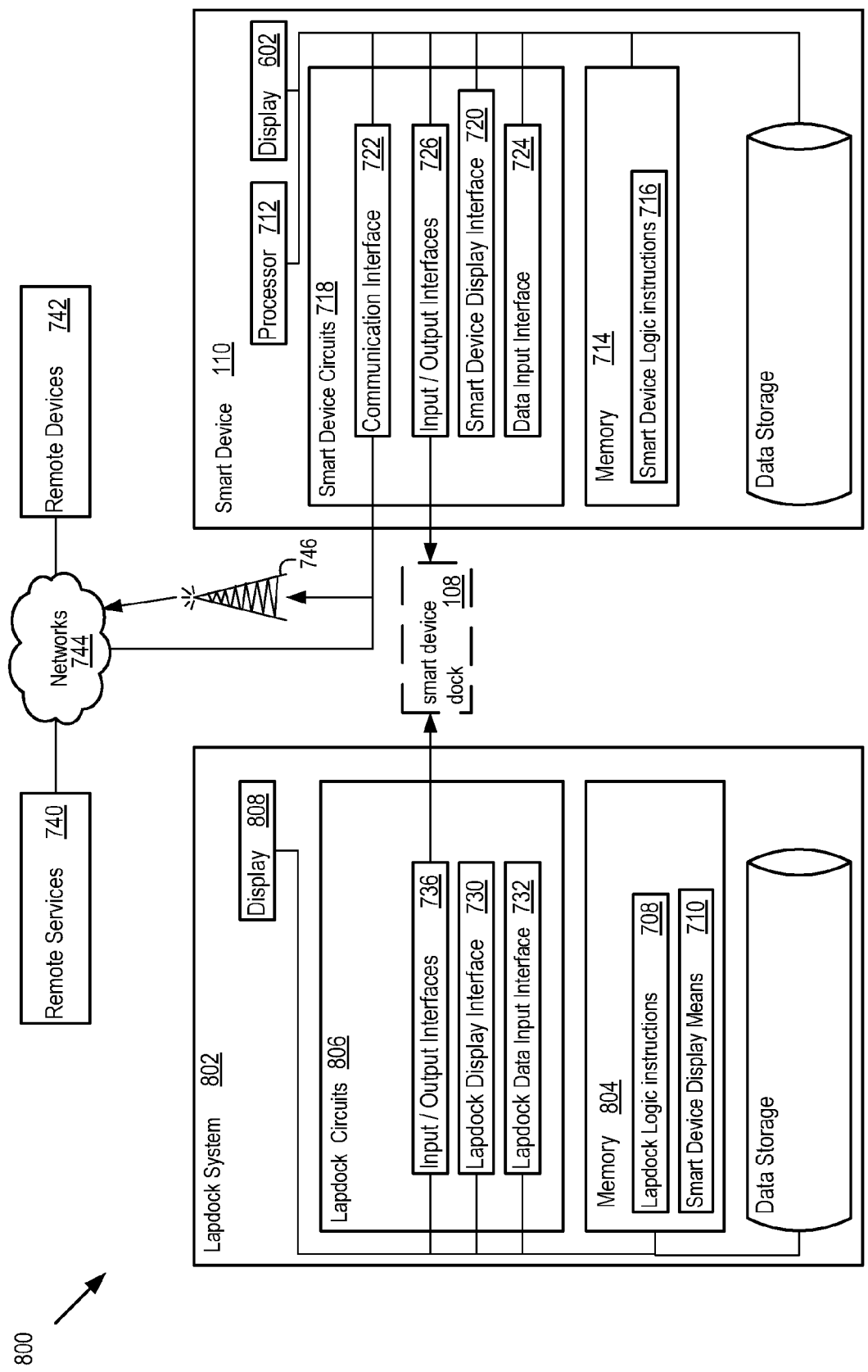
FIG. 8 is an illustration of another computer system configuration that may be used for the terminal system.

FIG. 8 is an illustration of another terminal system configuration 800 that may be used for the terminal system 802, where the smart device 110 provides the communications interface configured to provide communications between the smart device and peripherals connected to the terminal system configuration 800, when the smart device 110 is docked in the smart device dock 108. The terminal system 802 may include a memory 804 that includes the terminal logic instructions 708 executable by the smart device processor 712 that when executed cause the processor 712 to control the smart device dock 108 and the smart device display component 710. The terminal system 802 may include a plurality of terminal circuits 806 that include a display interface 730, a data input interface 732, and/or other user interfaces, including input/output interfaces 736. When the smart device 110 is docked in the smart device dock 108, the smart device 110 may control the operation of at least one of the terminal circuits 806 and the terminal system display 808. The terminal system configuration 800 may use the communication interface 722 of the smart device 110 to access the remote services 740 and remote devices 742 via the network 744, when the smart device 110 is docked in the smart device dock 108.

Figure 9:
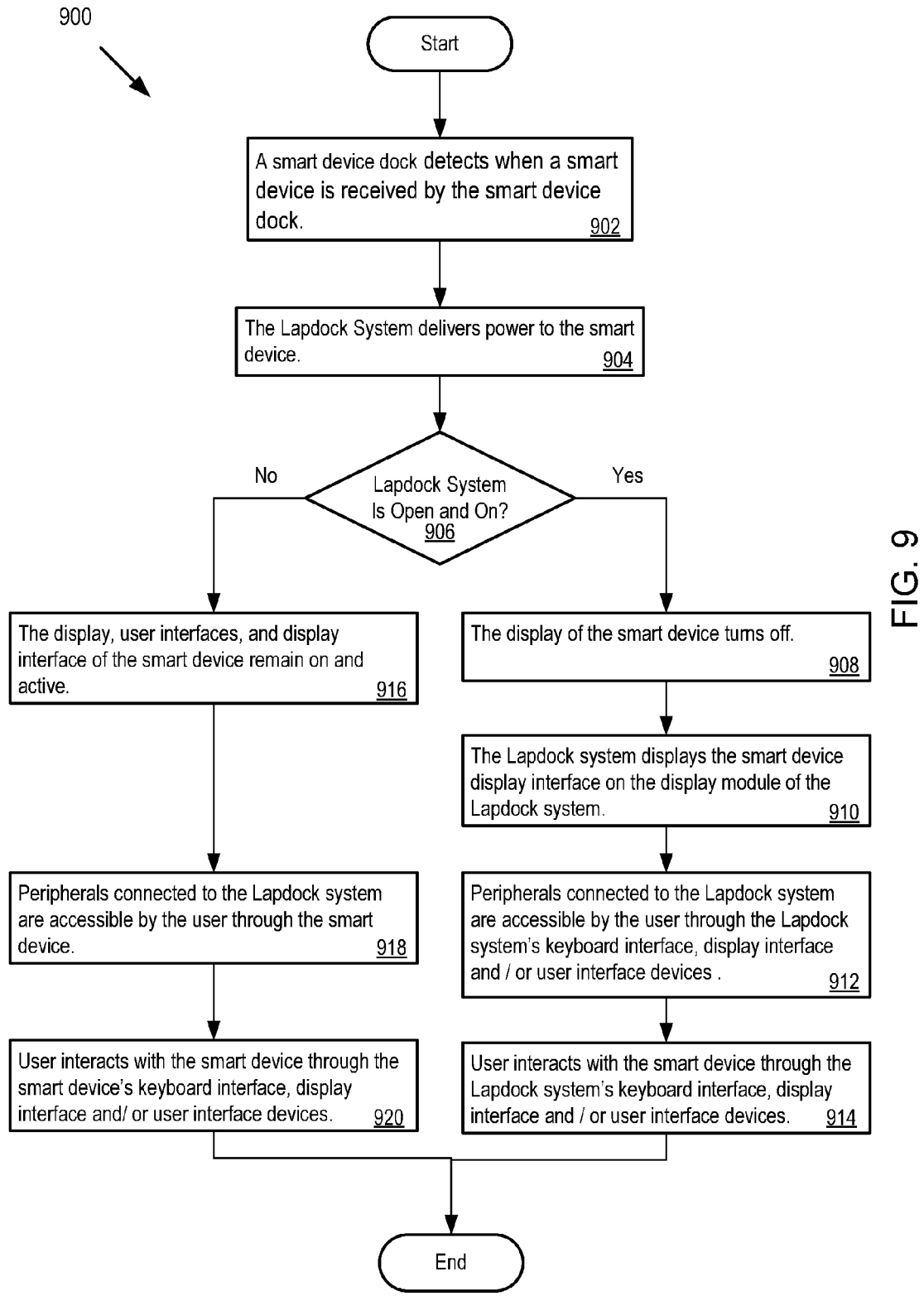
FIG. 9 is an illustration of a flow diagram that describes the logic steps used for the terminal system.

FIG. 9 is an illustration of a flow diagram 900 that describes the logic steps that may be used for the terminal system 100. The smart device dock 108 detects when a smart device 110 is received by the smart device dock 108 (902). The hinged connections 106 may include an angle detection component that detects the angle of the display screen 206, as well as the angle of the smart device dock 108, in order to determine whether the terminal system 100 is in an open or closed position. The terminal system delivers power to the smart device 110, when a smart device 110 is received by the smart device dock 108 (904). The terminal system determines whether the terminal system is in a closed or open position, and turned off or on (906). When the terminal system 100 is in the open position and/or turned on, the smart device display component 710 causes the smart device display 602 to turn off (908). The terminal system 100 displays the content of the smart device display interface on the terminal system display screen 206 (910). Peripherals connected to the terminal system are accessible by the user through the terminal system's keyboard interface, display interface and/or user interface devices (912). The user may then interact with the smart device 110 through the terminal system's keyboard interface, display interface and/or user interface devices (914).

When the terminal system 100 is in the closed position and/or turned off, the smart device display component 710 causes the smart device display 602, user interfaces, and display interface of the smart device to remain on and active (916). Peripherals connected to the terminal system 100 are accessible by the user through the smart device 110 (918). The user may then interact with the smart device 110 through the smart device's keyboard interface, display interface and/or user interface devices (920).

In a networked deployment, the smart device 110 docked to the terminal system 100 may in combination operate in the capacity of a server or as a client user computer in a server-client user network environment, or as a peer computer system in a peer-to-peer (or distributed) network environment. The terminal system 100 may be implemented using electronic devices that provide voice, video or data communication.

The processors disclosed herein may include a central processing unit (CPU), a graphics processing unit (GPU), or both. The processor may be a component in a variety of systems. For example, the processors may be part of a standard personal computer or a workstation. The processors may be one or more general processors, digital signal processors, application specific integrated circuits, field programmable gate arrays, servers, networks, digital circuits, analog circuits, combinations thereof, or other now known or later developed devices for analyzing and processing data. The processors may implement a software program, such as code generated manually (i.e., programmed).

The memory 706, 804 of the terminal system 100 may be a main memory, a static memory, or a dynamic memory. The memory 706, 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 706, 804 may include a cache or random access memory for the processor. Alternatively or in addition, the memory 706, 804 may be separate from the processor, such as a cache memory of a processor, the system memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 706, 804 may be operable to store instructions 708, 710 executable by the processor. The functions, acts or tasks illustrated in the figures or described herein may be performed by the programmed processor executing the instructions 708, 710 stored in the memory 706, 804. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The display screen 206 may include a liquid crystal display (LCD), an organic light emitting diode (OLED), a flat panel display, a solid state display, a cathode ray tube (CRT), a projector, a printer or other now known or later developed display device for outputting determined information. The display screen 206 may act as an interface for the user to see the functioning of the processor, or specifically as an interface with the software stored in the memory 708, 710.

Additionally, the terminal system 100 may include an input device configured to allow a user to interact with any of the components of the terminal system 100 and a smart device 110 docked in the smart device dock 108. The input device may be a number pad, a keyboard, or a cursor control device, such as a mouse, or a joystick, touch screen display, remote control or any other device operative to interact with the system.

The terminal system 100 may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the terminal system 100. The memory and the processor also may include computer-readable media as discussed above.

The present disclosure also contemplates a computer-readable medium that may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein. The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

The computer-readable medium may include instructions or receives and executes instructions responsive to a propagated signal; so that a device connected to a network 744 may communicate voice, video, audio, images or any other data over the network 744. Further, the instructions may be transmitted or received over the network 744 via a communication interface. The communication interface may be a part of the processor or may be a separate component. The communication interface may be created in software or may be a physical connection in hardware. The communication interface may be configured to connect with a network 744, external media, the display 206, or any other components in system 100, or combinations thereof. The connection with the network 744 may be a physical connection, such as a wired Ethernet connection or may be established wirelessly as discussed below. Likewise, the additional connections with other components of the system 100 may be physical connections or may be established wirelessly. The network 744 may include wired networks, wireless networks, or combinations thereof. The wireless network may be a cellular telephone network, an 802.11, 802.16, 802.20, or WiMax network. Further, the network 744 may be a public network, such as the Internet, a private network, such as an intranet, or combinations thereof, and may utilize a variety of networking protocols now available or later developed including, but not limited to TCP/IP based networking protocols.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A mobile computing terminal including electrical circuitry, the mobile computing terminal including:
   a body;

a display module, said display module including a display screen, said display module movingly carried on said body to move between at least open and closed positions; and a dock comprising: a cradle configured to receive a smart device including a smart device display interface, wherein the smart device display interface is turned off during said open position and the smart device display interface is turned on during said closed position, said dock associated with a quick-disconnect connector oriented to electrically connect to the smart device when received in said dock, said dock configured to hold the smart device in a predetermined orientation relative to said display module in said open position, and said quick-disconnect connector to releaseably electrically connect the smart device received in the dock to said electrical circuitry.

2. The mobile computing terminal according to claim 1, wherein the terminal is adapted to deliver electrical energy from an electrical energy source to the smart device via said electrical circuitry and said quick-disconnect connector.

3. The mobile computing terminal according to claim 1, wherein said display module is connected to said body by a hinged connection to permit adjusting of a viewing angle of the display screen.

4. The mobile computing terminal according to claim 3, wherein one of the display and body includes a stop, the stop limiting relative motion of the display module to a limit with the display having a predetermined orientation relative to the orientation of a smart device lodged in said dock.

5. The mobile computing terminal according to claim 4, wherein said dock and said display are each rotateably carried on said body.

6. The mobile computing terminal according to claim 5, wherein said dock and said display each rotate about a respective pivot axis, said pivot axis being substantially parallel, and said display in an open stop position oriented substantially in parallel with the smart device lodged in said dock in an open position.

7. The mobile computing terminal according to claim 5, wherein said dock and said display are oriented such that the smart device lodged in said dock in an open position has near field free space around an antenna to enhance performance of a wireless communication link of the smart device.

8. The mobile computing terminal according to claim 5, wherein said dock and said display are oriented such that the smart device lodged in said dock in an open position with the display module closed oriented for viewing by a user, and is blocked by the display module in the open position.

9. The mobile computing terminal according to claim 4, wherein said dock is located behind the display screen, and connected to the terminal by the hinged connections configured to rotate said dock about the hinged connections to a predetermined orientation relative to the position of the fully open stopped display module.

10. The mobile computing terminal according to claim 1, wherein the body of the terminal comprises a keyboard, and wherein the display screen and the keyboard face one another when the terminal is in the closed position.

11. The mobile computing terminal according to claim 1, wherein the display module includes a recessed portion in which said dock is located, wherein the smart device when docked, is positioned on a back of one of the portions of the display module.

12. A method for securing a portable electronic device to a smart device, the method comprising:
    receiving a smart device including a smart device display interface into a dock of the portable electronic device;
    providing electrical energy to the smart device through a quick-disconnect connector configured to connect the smart device to said dock;
    interacting with the smart device by using a user interface of the portable electronic device; and
    displaying content of the smart device display interface on a display screen of the portable electronic device, wherein the display screen is movingly carried on a body of the portable electronic device to move between at least an open position and a closed position, and further wherein the smart device display interface is turned off during the open position of the display screen and turned on during the closed position of the display screen.

13. The method of claim 12, wherein the portable electronic device user interface comprises: a keyboard; a pointing device; the display screen with touch detection.

14. The method of claim 12, wherein the portable electronic device comprises: a body, a display module, and hinged connections, wherein the display module includes the display screen, and wherein the hinged connections connect the display module to the body.

15. The method of claim 12, the method further comprising: communicating with peripherals connected to the portable electronic device, using a communications interface configured to provide communications to the smart device.

16. The method of claim 12, wherein the dock comprises smart device docking guides, and wherein receiving the smart device into the dock comprises using the smart device docking guides to guide the smart device into the dock.

17. The method of claim 12, wherein said dock comprises a smart device dock base, and wherein receiving the smart device into said dock comprises resting an edge of the smart device on said dock base in order to receive the smart device into the dock.

* * * * *